United States Patent [19]

Okamura

[11] Patent Number: 5,726,552
[45] Date of Patent: Mar. 10, 1998

[54] METHOD AND APPARATUS FOR CONTROLLING CHARGING OF ELECTRICAL POWER STORAGE UNIT

[75] Inventor: Michio Okamura, Yokohama, Japan

[73] Assignee: Jeol Ltd., Tokyo, Japan

[21] Appl. No.: 607,079

[22] Filed: Feb. 26, 1996

[30] Foreign Application Priority Data

Feb. 27, 1995 [JP] Japan ................................. 7-037869

[51] Int. Cl.$^6$ ........................... H01M 10/44; H02J 7/04
[52] U.S. Cl. ........................................ 320/7; 320/39
[58] Field of Search ................................ 320/1, 67, 16, 320/18, 17, 39; 361/502; 307/31

[56] References Cited

U.S. PATENT DOCUMENTS

| | | | |
|---|---|---|---|
| 5,063,340 | 11/1991 | Kalenowsky | 320/1 |
| 5,304,915 | 4/1994 | Sanpei et al. | 320/14 |
| 5,387,857 | 2/1995 | Honda et al. | 320/18 |
| 5,469,042 | 11/1995 | Ruhling | 320/17 |
| 5,519,563 | 5/1996 | Higashijima et al. | 361/16 |
| 5,528,121 | 6/1996 | Okamura | 320/1 |
| 5,545,933 | 8/1996 | Okamura et al. | 307/109 |
| 5,557,189 | 9/1996 | Suzuki et al. | 320/18 |
| 5,578,914 | 11/1996 | Morita | 320/18 |

Primary Examiner—Peter S. Wong
Assistant Examiner—Gregory J. Toatley, Jr.
Attorney, Agent, or Firm—Webb Ziesenheim Bruening Logsdon Orkin & Hanson, P.C.

[57] ABSTRACT

An electric power storage unit consisting of a series combination of capacitor cells. The storage unit is electrically charged with a constant charging current from a charger with a simple structure. If necessary, the simple structure remotely controls the limit voltages of the capacitor cells and varies the capacity and output power of the storage unit according to use conditions. When the terminal voltages reach reference voltages, parallel charging control units bypass the charging current. The parallel charging control units comprise shunt regulators connected in parallel with their respective capacitor cells and acting to bypass the charging current, coupling circuits for connection with a signal source and reference voltage control circuits. The reference voltage control the circuits establish reference voltages according to the output signals from the coupling circuits, compare the terminal voltages of the capacitor cells and control the shunt regulators according to the results of the comparisons. The control units can be digitized using digital signals.

7 Claims, 6 Drawing Sheets

METHOD AND APPARATUS FOR CONTROLLING CHARGING OF ELECTRICAL POWER STORAGE UNIT

BACKGROUND OF THE INVENTION

1. Field of the Invention

The present invention relates to a parallel charging control unit including a bypass circuit connected in parallel to a storage capacitor cell for bypassing a charging current flowing to the capacitor cell.

The invention also relates to an electric power storage unit consisting of a series combination of a plurality of capacitor cells, together with the aforementioned parallel charging control units. Furthermore, the invention relates to a method of controlling the charging of such capacitor cells.

2. Description of the Related Art

We have already proposed parallel charging control units, known as parallel monitors, in an attempt to make uniform the voltages assigned to electric double layer capacitors connected in series in an electric power storage unit (Japanese Patent Laid-Open Nos. 292683/1993 and 292684/1993). These control units are next described by referring to FIG. 9.

Referring to FIG. 9, the capacitor C represents one of the capacitors connected in series inside an electric power storage unit, for example. The parallel charging control unit 21 is connected as a parallel monitor in parallel with the capacitor C. This control unit 21 comprises a comparator CMP, a transistor TR and a reference voltage source whose output voltage is Vr.

In the operation of the known parallel monitor or the parallel charging control unit 21, the comparator CMP compares the voltage developed across the terminals of the capacitor C with the reference voltage Vr. When the terminal voltage exceeds a certain value, the transistor TR is biased into conduction. Subsequently, the charging current flowing toward the capacitor C is bypassed to the transistor TR. As a consequence, the capacitor C is prevented from becoming overcharged.

In the electric power storage unit equipped with the above-described electric double layer capacitors, each capacitor connected in series is equipped with the parallel monitor as shown in FIG. 9. Thus, the voltage set up across the terminals of each capacitor is prevented from increasing beyond the preset voltage. Hence, every capacitor can be protected. The electric power storage unit consisting of a series combination of capacitors is charged with a constant current from a charger. It is common practice to control the charging of the storage unit as follows: If the charged voltage, i.e., the sum of voltages developed across the capacitors connected in series, exceeds a certain value, then the storage unit is judged to have been fully charged. The charging operation is then stopped.

Recent researches have revealed that the maximum charging voltage of an electric double layer capacitor does not have a constant value determined by the electrochemical characteristics of the material and other factors, unlike a secondary battery. In order to prolong the lifetime of the electric double layer capacitor, it should only be charged to a relatively low voltage. However, the electric double layer capacitor can be charged to a relatively high voltage without shortening the lifetime if the period of time at such high voltage is short enough.

Meanwhile, the above-described known parallel monitor acts to limit the terminal voltage of each capacitor to its preset constant value which has been determined in designing the storage unit. Therefore, in order to charge the capacitors to a low voltage to prolong their lifetimes as mentioned above, it is necessary to modify the voltage incorporated into the parallel monitor (in the case of FIG. 9, the reference voltage Vr). However, an electric vehicle, an electric storage unit or the like uses tens or hundreds of capacitors connected in series to form an electric power storage system. If parallel monitors as shown in FIG. 9 are used with such an electric power storage system, then it is necessary to change all the preset reference voltages Vr of individual capacitors. This presents a problem in practical applications.

SUMMARY OF THE INVENTION

It is an object of the present invention to provide parallel charging control unit, electric power storage unit and charging control method for solving the foregoing problem. The charging control unit is provided with a simple structure which remotely controls the limit voltage of each capacitor if necessary. The capacity of the electric power (energy) storage unit and its output power can be controlled according to the conditions of use.

One embodiment of the invention lies in a parallel charging control unit for use with a capacitor cell which stores electric energy by being charged with a charging current. When the capacitor cell is charged to the reference voltage, the parallel charging control unit bypasses the charging current. The parallel charging control unit comprises a charging current bypass circuit (interconnected electrical elements) connected in parallel with the capacitor cell, a coupling system for connection with a signal source and a control circuit. The charging current bypass circuit acts to bypass the charging current. The control circuit establishes the reference voltage according to an output signal from the coupling system, compares the voltage developed across the terminals of the capacitor cell with the reference voltage and controls the charging current bypass circuit according to the result of the comparison. A voltage-setting signal is supplied from a source via the coupling system. The reference voltage of the charging current bypass circuit is controlled according to the voltage-setting signal.

Another embodiment of the invention lies in an electric power storage unit composed of a plurality of capacitor cells connected in series. Charging of the capacitor cells is controlled by their respective parallel charging control units. Each control unit comprises a charging current bypass circuit connected in parallel with the corresponding capacitor cell and acting to bypass the charging current, a coupling system for connection with a signal source and a control circuit. The control circuit establishes a reference voltage according to the output signal from the coupling system. The control circuit compares the voltage developed across the terminals of the connected capacitor cell with the reference voltage and controls the charging current bypass circuit according to the result of the comparison. The capacitor cells are electrically charged as follows. A voltage-setting signal is supplied to the charging control units for the capacitor cells from a signal source and the reference voltage is controlled. The capacitor cells are kept charged with a constant current from an electric current source until the sum of voltages developed across the terminals of the capacitors reaches a certain value.

The novel parallel charging control units comprise the charging current bypass circuit connected in parallel with the capacitor cells, respectively, and acting to bypass the charging current, the coupling system for connection with the signal source, and the control circuit for establishing reference voltages according to the output signals from the coupling means. The control circuit compares the voltages developed across the terminals of the capacitor cells with their respective reference voltages and controls the charging current bypass means according to the results of the comparisons. The reference voltages on which the charging current bypass means operate are controlled according to the voltage-setting signal which is supplied from the signal source via the coupling circuit. If necessary, the reference (limit) voltage of each capacitor cell can be remotely controlled with a simple configuration incorporated in the electric current source, using the signal source. The capacity and output power of the electric power storage unit can be controlled according to the conditions of use.

Other objects and features of the invention will appear in the course of the description thereof, which follows.

DETAILED DESCRIPTION OF THE INVENTION

Figure 1:
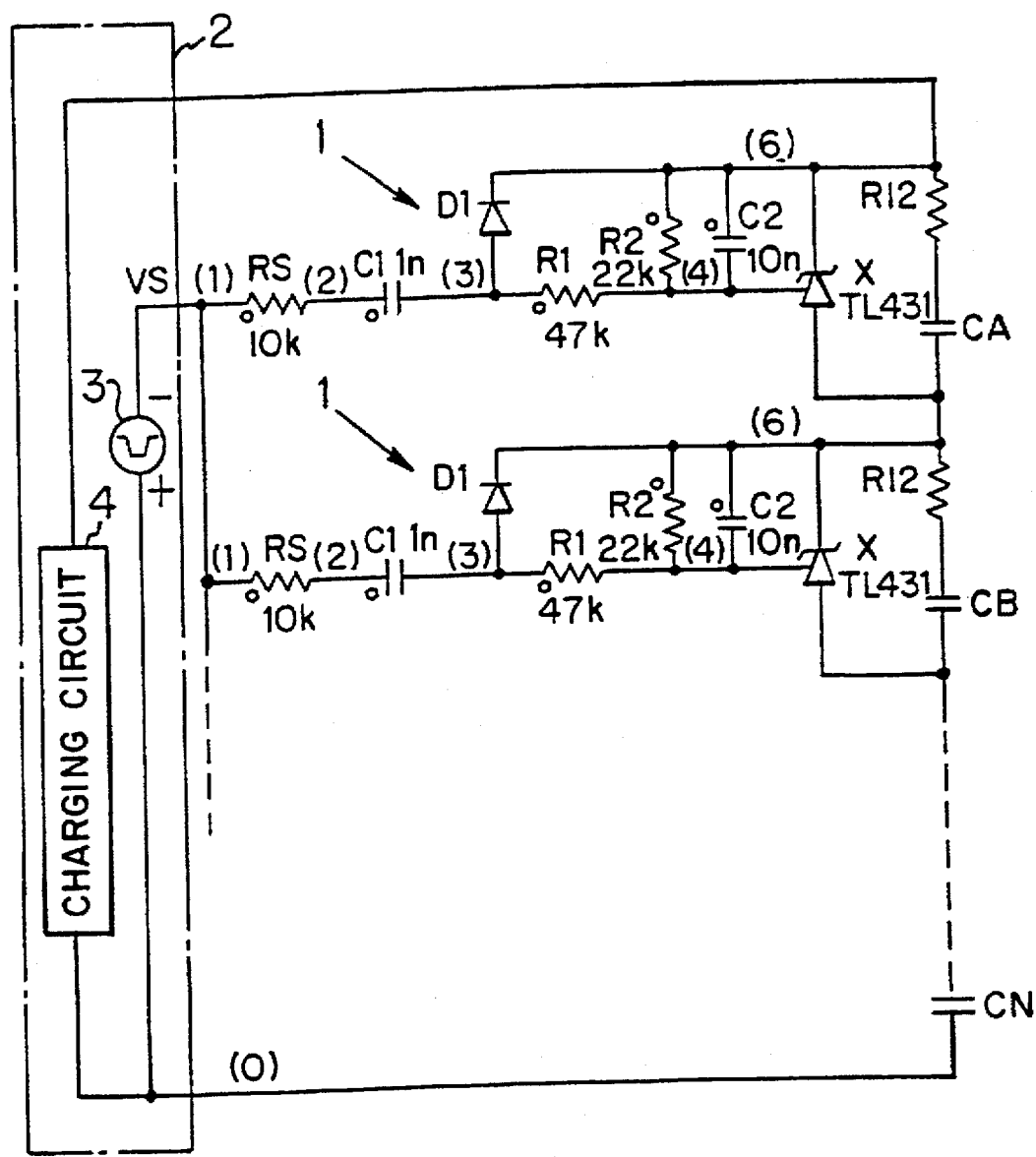
FIG. 1 is a circuit diagram of parallel charging control units according to the present invention.

Referring to FIG. 1, there are shown parallel charging control units embodying the concept of the present invention. Each of these control units is generally indicated by reference numeral 1, and is for use with an electric current source (charger) 2 having a signal source 3 and a charging power supply circuit 4. Capacitor cells CA, CB, . . . , CN are connected in series to store electric power. Each parallel charging control unit 1 has capacitors C1 and C2, a diode D1, resistors R1, R2, RS, R12, and a shunt regulator X. For example, the capacitor cells CA, CB, . . . , CN are electric double layer capacitors and each capacitor cell has the internal resistance R12.

The parallel charging control units 1 are parallel monitors consisting of shunt regulators X and their respective reference voltage control circuits, the shunt regulators X being connected in parallel with the capacitor cells CA, CB, . . . , CN, respectively. The shunt regulators X are charging current bypass elements for bypassing the charging current so as to limit the terminal voltages. A general-purpose IC can be used as the charging current bypass element. For example, when the voltage between anode (6) and control terminal (4) is 0, the IC operates at a voltage of 2.5 V. When an input voltage is applied between the anode (6) and the control terminal (4), the IC operates at a voltage which is equal to 2.5 V plus the input voltage. As an example, TL431 manufactured by Texas Instruments can be used as this IC.

The resistors R1, R2, the diode D1 and the capacitor C2 together form a circuit for controlling the operation of each shunt regulator X. More specifically, this control circuit performs rectification and smoothing. The capacitor C2 serves to remove ripple. The resistors R1 and R2 are used for voltage division. In the operation of this control circuit, if a negative pulse voltage signal is cyclically applied to the node (3), then the voltage developed at the node (6) is divided by the resistors R1 and R2. Consequently, a smoothed voltage is produced across the capacitor C2 according to the resulting voltage and duty cycle of the pulses (on/off ratio). This smoothed voltage is applied as a bias voltage between the anode (6) and the control terminal (4) of each shunt regulator X. That is, this bias voltage is added to the default value of 2.5 V of the shunt regulator X, thus forming a reference voltage. According to this reference voltage, the voltage on which the shunt regulator X operates is controlled and the voltages developed across the terminals of the capacitor cells CA, CB, . . . , CN are restricted. The resistor RS is used in coupling the control circuit to the signal source 3. The capacitor C1 is used in AC-coupling the control circuit to the signal source 3.

The charger 2 has the charging power supply circuit 4 and the signal source 3 as mentioned above. The charging power supply circuit 4 charges the capacitor cells CA, CB, . . . , CN with a constant current. The charging power supply circuit 4 also acts to detect the voltage developed across the output terminals. If the sum of the voltages developed across the capacitor cells CA, CB, . . . , CN connected in series exceeds a certain value, then the charging power supply circuit 4 judges that the capacitor cells have been fully charged. Then, the charging power supply circuit 4 stops the charging. The signal source 3 controls the limit values of the voltages developed across the capacitor cells CA, CB, . . . , CN according to the duty cycle. The signal source 3 supplies a negative pulse voltage signal to the control circuit through the resistor RS and the capacitor C1.

The operation is next described. When the signal source 3 of the charger 2 does not produce a control signal VS, control input terminal (4) of each shunt regulator X is connected to the node (6) via the resistor R2. Almost no voltage drop is developed across the resistor R2 and so that shunt regulator X (such as TL431 manufactured by Texas Instruments) operates as a 2.5 V-shunt regulator as stipulated in its specification. This is the default operation.

However, when the negative pulse voltage signal VS is applied from the signal source 3 of the charger 2, the signal VS flows into the resistors R1 and R2 of the control circuit via both resistor RS and capacitor C1. The signal VS is rectified by the diode D1 and the voltage developed across the terminals of the resistor R2 is smoothed by the capacitor C2. That is, a negative voltage appears at the node (6) according to the amplitude and duty cycle of the negative voltage signal VS applied to the node (3). This negative voltage is divided by the resistors R1 and R2, and the resulting voltage is impressed between the nodes (4) and (6). Therefore, the set value of the shunt regulator X is increased by an amount corresponding to this impressed negative voltage. Accordingly, the upper limits of the charging voltages for the numerous capacitor cells CA, CB, . . . , CN can be controlled in a batch by connecting the nodes (1) of the parallel charging control units 1 with the signal source 3 of the charger 2 and adjusting the waveform of the negative pulse voltage signals VS, i.e., the duty cycles.

Specific examples of the various values used in designing the units are shown in FIG. 1. Assuming that the internal resistance R12 of each of the capacitor cells CA, CB, . . . , CN is on the order of 10 Ω, the resistor RS is 10 k Ω. The resistor R1 is 47 k Ω. The resistor R2 is 22 k Ω. The capacitor C1 is 1 nF. The capacitor C2 is on the order of 10 nF. Therefore, the negative pulse voltage signal VS can have relatively small electric power. For example, 100 parallel monitors can be driven with an output from an IC buffer.

Figure 2:
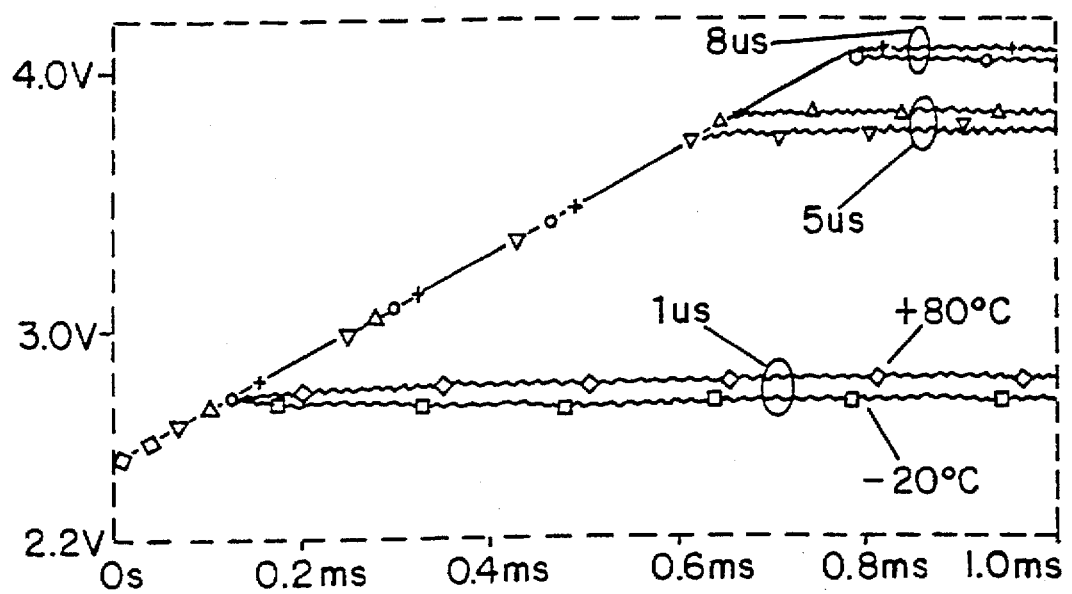
FIG. 2 is a diagram showing the operating characteristics and the temperature characteristics of the parallel charging control units shown in FIG. 1.
Figure 3:
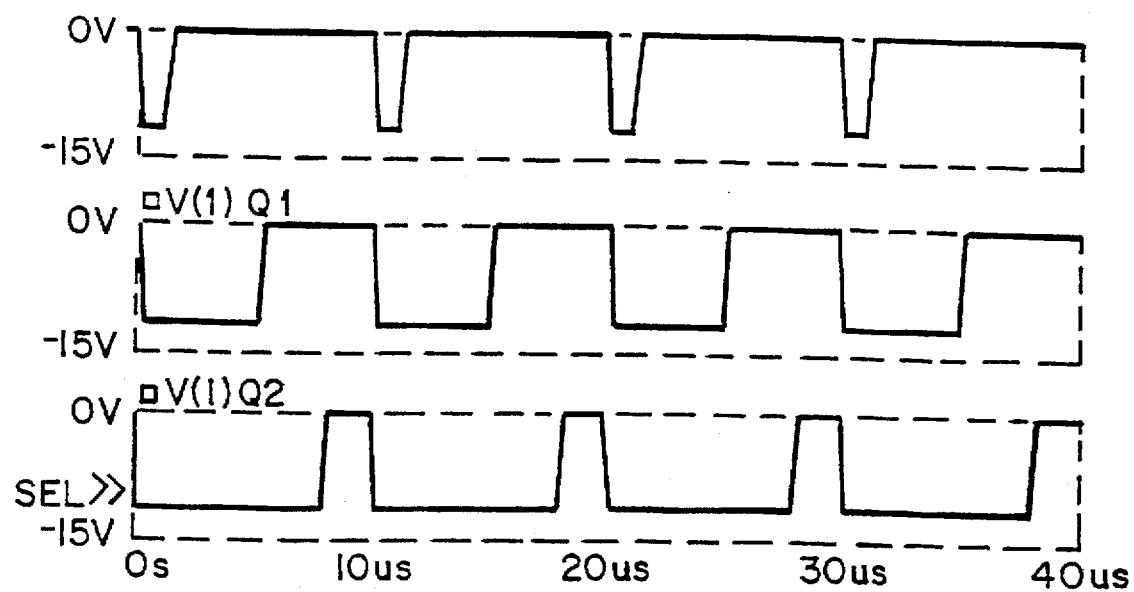
FIG. 3 is a waveform diagram of a control signal VS produced by a battery charger for use with the parallel charging control units shown in FIG. 1.

In FIG. 3, voltage is plotted on the vertical axis, while time is plotted on the horizontal axis. The pulse width of the negative pulse voltage signal VS was varied to 1 μs, 5 μs and 8 μs. The operating characteristics and temperature characteristics obtained under these conditions are shown in FIG. 2. Two lines were produced at each level because the temperature was set to −20° C. and +80° C. The characteristics are sufficiently usable even if the temperature range is extended to 100° C.

Figure 9:
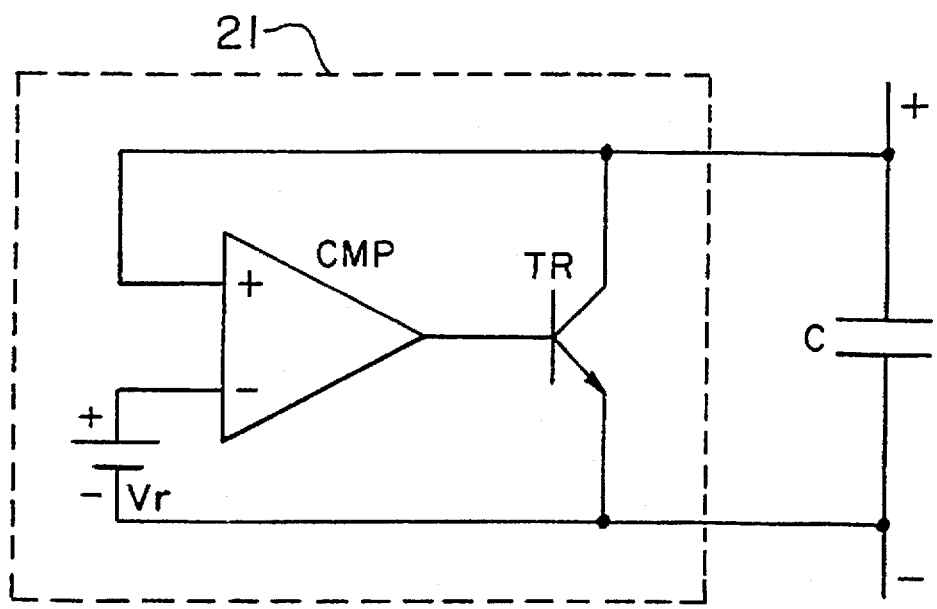
FIG. 9 is a circuit diagram of a known parallel charging control unit.

Generally, in order to control the set voltages of the numerous parallel monitors as the need arises, the reference voltage source Vr shown in FIG. 9 and similar reference voltage sources are concentrated in some location. The used reference voltage may be switched from one to another. Alternatively, either the voltage-dividing resistor used for detecting the reference voltage or the voltage developed across the capacitor may be switched to another. Where parallel charging control units are constructed according to the invention as described above, the circuitry is made simpler. Also, the circuitry is made more immune to noises. Furthermore, the voltages can be controlled over a wide range and continuously only by varying the control signal produced from the charger. In addition, since a default value is incorporated into each parallel monitor, if the control signal from the signal source 3 of the charger should be stopped, the default values would be regained. Hence, the voltages are prevented from assuming abnormal values.

Figure 4:
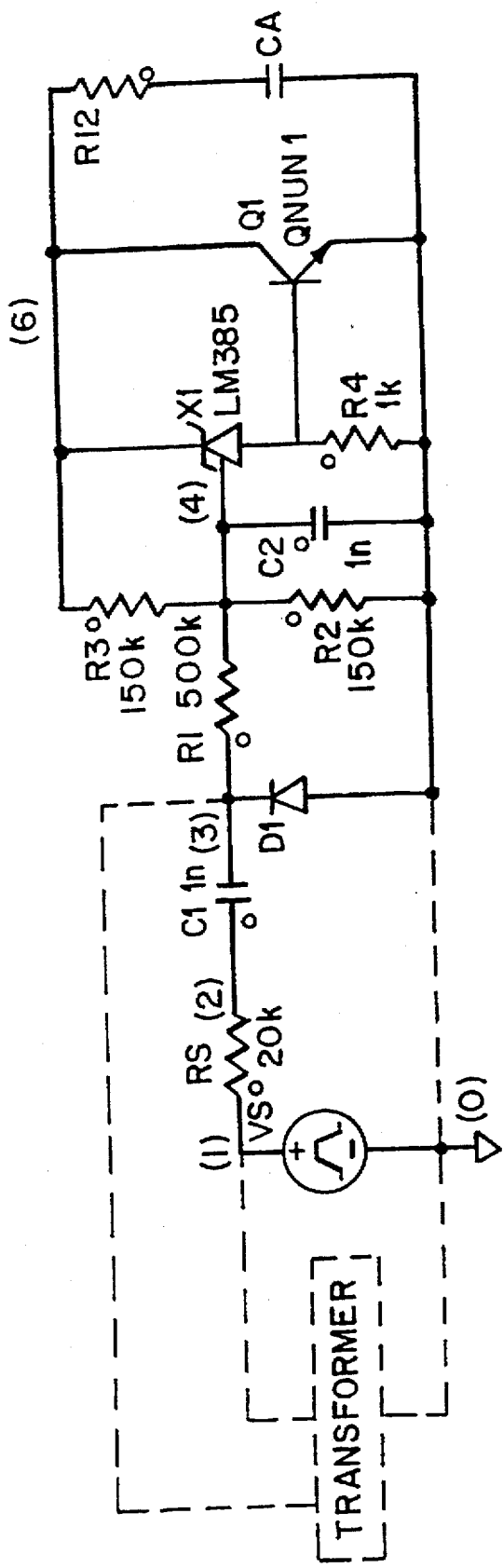
FIG. 4 is a circuit diagram of another parallel charging control unit according to the present invention.
Figure 5:
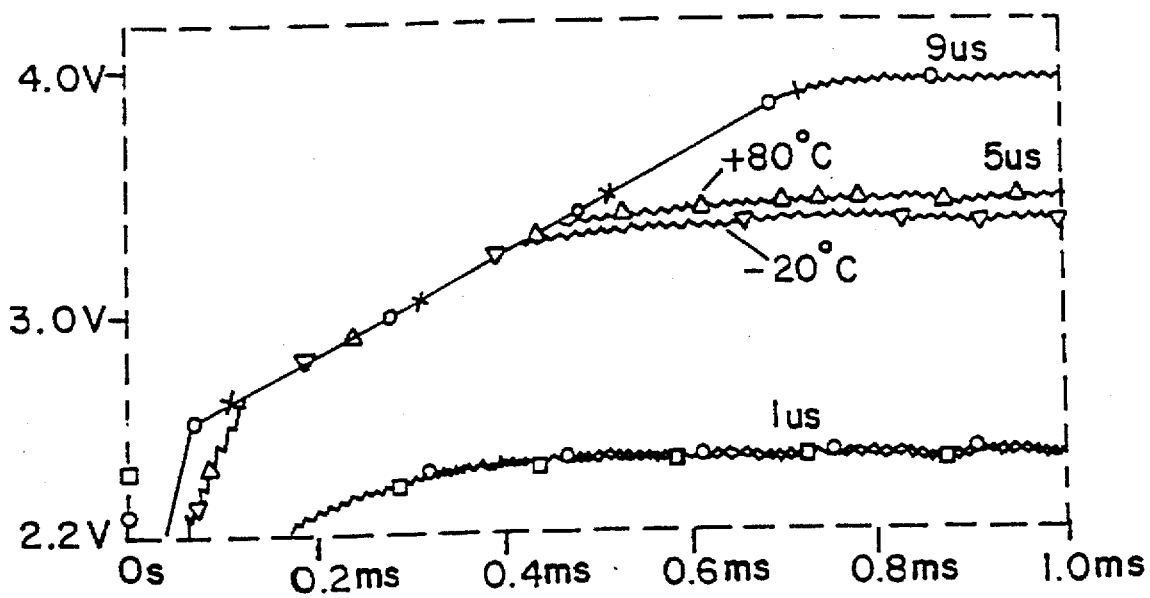
FIG. 5 is a diagram showing the operating characteristics of the parallel charging control unit shown in FIG. 4.

Another parallel charging control unit according to the invention is shown in FIG. 4. The operating characteristics of this control unit are shown in FIG. 5. Referring to FIG. 4, a shunt regulator X1 is a 1.25 V-shunt regulator such as LM385 manufactured by National Semiconductors. This shunt regulator X1 has a higher sensitivity than the shunt regulators shown in FIG. 1 and an operating voltage half the operating voltage of the latter shunt regulators. In this shunt regulator X1, the input current to the control terminal connected at the node (4) can be made smaller. Therefore, the control unit can be designed using high resistors throughout the unit. This can alleviate the load imposed on the signal source 3 of the charger 2. Furthermore, the linearity of the set voltage with respect to the pulse width of the pulse voltage signal VS can be improved. The circuit configuration is similar to the circuit configuration shown in FIG. 1 except for the following points. The reference potential of the shunt regulator X1 is at the node (6) on the cathode side on the opposite side of the shunt regulator X shown in FIG. 1. Therefore, the control voltage is coupled at a different position. Consequently, the supplied pulse voltage signal VS is a positive-going pulse and adjusts the voltage developed between the resistor R2 and the capacitor C2 which are connected between the control terminal of the shunt regulator X1 and the anode. Since the shunt regulator X1 has a small amount of permissible current, a transistor Q1 is used for amplification of the current. The operating characteristics of this example are shown in FIG. 5.

Figure 7:
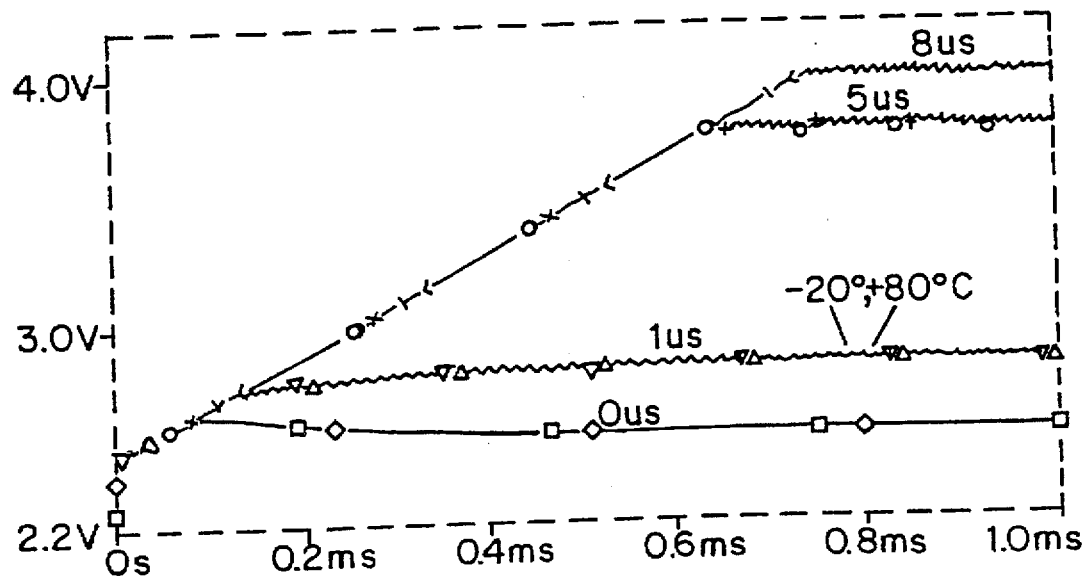
FIG. 7 is a circuit diagram of a temperature compensation circuit included in the parallel charging control unit shown in FIG. 6.
Figure 6:
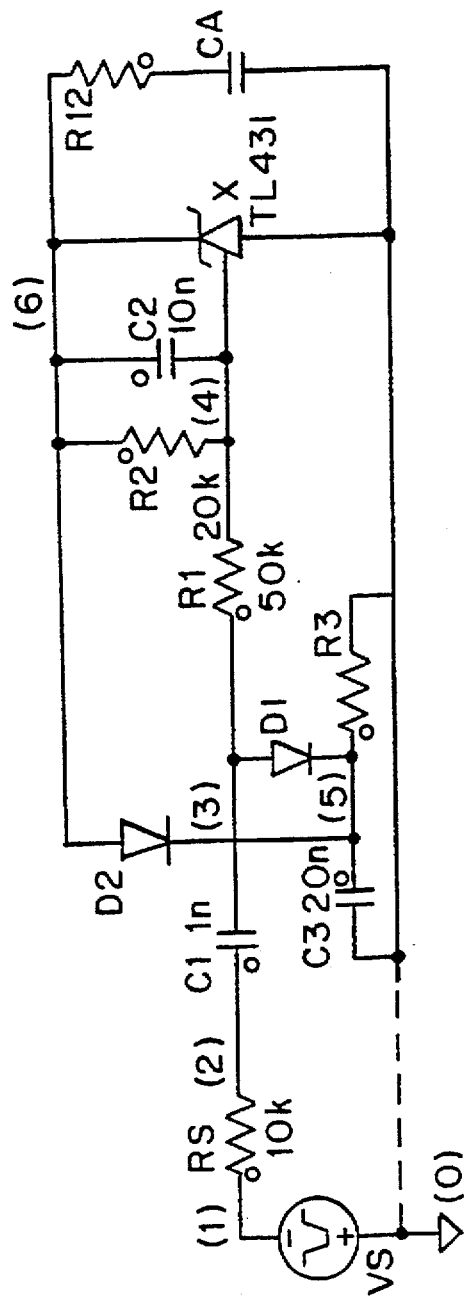
FIG. 6 is a circuit diagram of a further parallel charging control unit according to the present invention.

A further parallel charging control unit according to the invention is shown in FIG. 6. FIG. 7 shows the characteristics of a temperature compensation circuit included in the control unit shown in FIG. 6.

The control unit shown in FIG. 6 is similar to the circuit configuration shown in FIG. 1 except that a circuit consisting of a diode D2, a resistor R3, and a capacitor C3 is added. To compensate the temperature dependence on the diode D1 connected between nodes (3) and (6), a connection is made, using the diode D2. By the addition of this temperature compensation circuit, the effect of the temperature dependence can be almost fully removed over the range of from −20° C. to +80° C., as shown in FIG. 7.

Figure 8:
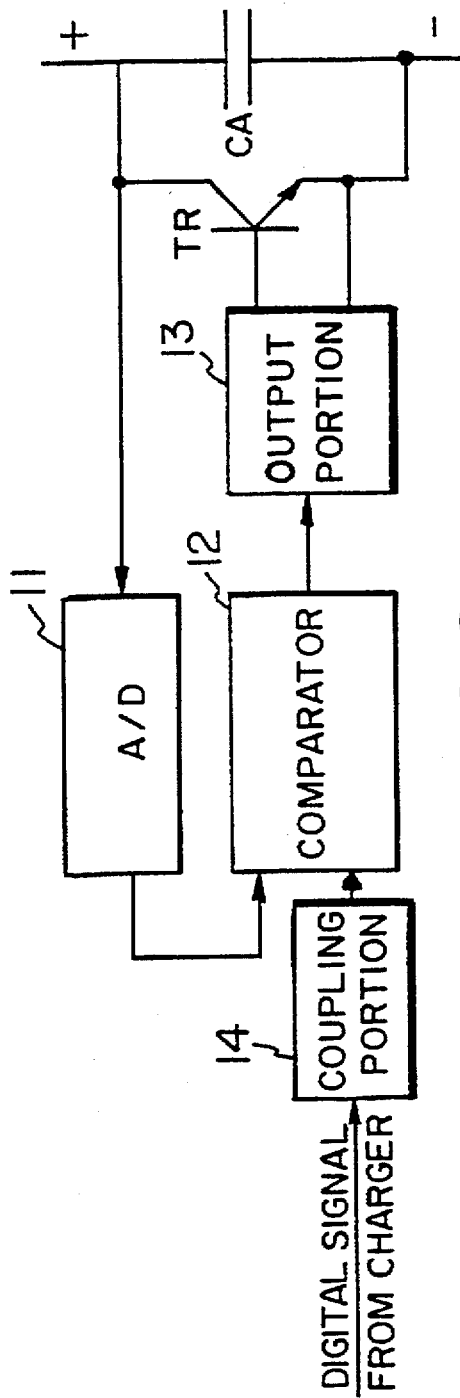
FIG. 8 is a block diagram of a digitized parallel charging control unit according to the invention.

The examples described thus far are realized with analog circuits. The present invention can be similarly implemented with digital circuits. FIG. 8 shows a digital version of a parallel charging control unit according to the present invention. This digital parallel charging control unit comprises an A/D converter portion 11, a comparator 12, an output portion 13, and a coupling portion 14. The A/D converter portion 11 converts the analog voltage developed across the terminals of a capacitor cell CA into digital form. The coupling portion 14 is a receiving portion for receiving a set value in the form of a digital signal, the set value being sent as a control input from the charger. The comparator 12 compares the set value of the digital signal sent from the charger via the coupling portion 14 with the digital output from the A/D converter 11, i.e., the voltage developed across the terminals of the capacitor cell CA. When the voltage developed across the terminals of the capacitor cell CA reaches the preset value, the result of comparison made by the comparator 12 causes the output portion 13 to judge that the cell has been fully charged, and the output portion 13 drives a transistor TR into conduction. This bypasses the current for charging the capacitor cell CA to the transistor TR. By digitizing the parallel monitor in this way, parallel monitors using microprocessors or other digital circuits can be accomplished. Furthermore, a signal of a value selected from preset values can be sent from the charger. Moreover, the coupling portion 14 can be made a transmitting-and-receiving portion. In this case, parallel monitors measure the charging voltages for capacitor cells. It is easy to send information about the results of the measurements or other information back to the charger.

It is to be understood that the present invention is not limited to the above examples and that various changes and modifications are possible. Some of the above-described examples use parallel monitors making use of shunt regulators each of which consists of a dedicated IC such as TL431 or LM385 described above. In the other example, a parallel monitor is digitized, using a microcomputer chip. In brief, if parallel monitors connected in parallel with capacitor cells bypass a charging current supplied to the cells when limit voltages, i.e., fully charged state, established according to a reference voltage are reached, then the monitor may use a combination of a general-purpose operational amplifier and a transistor in the same way as the known configuration shown in FIG. 9 or employ other semiconductor devices or ICs which have been heretofore used to bypass currents. The parallel monitors are designed to control reference voltages Vr which are limit voltages. Of course, in these cases, default values may be set using referring voltage sources, constant-voltage devices, or the like. Adjusting values obtained from pulses, AC signals, or digital signals coming from a remote location may be superimposed on the default values. Furthermore, reference voltages for limiting voltages may be supplied from a remote location, along with default values.

In the above examples, where a pulse voltage signal source is used as a signal source, interconnection is made via a coupling circuit consisting of a resistor and a capacitor. The set value of the reference voltage is adjusted according to the duty cycle. A transformer may be used as the coupling circuit. In this case, the output produced across the secondary winding of the transformer is rectified and smoothed. The resulting signal is used to control the voltage from the control circuit. A photocoupler, other signal-transmitting means utilizing light, ultrasonic signal-transmitting means or other wellknown various signal-transmitting means may be used in the coupling system.

As can be understood from the description provided thus far in the present invention where a plurality of capacitor cells are connected in series to form an electric power storage unit and charged with a constant current, when the terminal voltages reach their reference voltages, the charging current is bypassed by parallel charging control units. For this purpose, control circuits are connected to a signal source via a coupling system. The operating voltages of the charging current bypass means are controlled according to a voltage-setting signal from the signal source. Therefore, the operating voltages can be controlled by supplying the voltage-setting signal to the parallel charging control units for their respective capacitor cells from the common signal source via coupling circuits. If necessary, therefore, the limit voltages of the capacitor cells can be remotely controlled easily by the battery charger with a simple structure. The capacity of the electric power storage unit and the output power can be varied according to use conditions.

Having thus described my invention with the detail and particularity required by the Patent Laws, what is desired protected by Letters Patent is set forth in the following claims.

What is claimed is:

1. A parallel charging control unit for use with a capacitor cell which is charged with a charging current so that electric energy is stored in said cell, said parallel charging control unit being responsive to a signal from a source of stop voltage-setting signals and adapted to bypass said charging current when said capacitor cell is charged to a stop voltage, said parallel charging control unit comprising:

charging current bypass means connected in parallel with said capacitor cell, for bypassing said charging current;

coupling means for connecting with a signal source which supplies a stop voltage-setting signal; and control means for establishing stop voltages according to output signals from said coupling means, said control means acting to compare said stop voltages with voltages corresponding to voltages developed across terminals of said capacitor cells and to control said charging current bypass means according to results of the comparisons, wherein said coupling means includes a capacitor, and through said coupling means said signal source supplies a pulse signal as an AC signal with a duty cycle corresponding to a reference voltage value to be controlled.

2. A parallel charging control unit for use with a capacitor cell which is charged with a charging current so that electric energy is stored in said cell, said parallel charging control unit being responsive to a signal from a source of stop voltage-setting signals and adapted to bypass said charging current when said capacitor cell is charged to a stop voltage, said parallel charging control unit comprising:

charging current bypass means connected in parallel with said capacitor cell, for bypassing said charging current;

coupling means for connecting with a signal source which supplies a stop voltage-setting signal; and control means for establishing stop voltages according to output signals from said coupling means, said control means acting to compare said stop voltages with voltages corresponding to voltages developed across terminals of said capacitor cells and to control said charging current bypass means according to results of the comparisons, wherein each of said coupling means consists of a pulse transformer.

3. A parallel charging control unit for use with a capacitor cell which is charged with a charging current so that electric energy is stored in said cell, said parallel charging control unit being responsive to a signal from a source of stop voltage-setting signals and adapted to bypass said charging current when said capacitor cell is charged to a stop voltage, said parallel charging control unit comprising:

charging current bypass means connected in parallel with said capacitor cell, for bypassing said charging current;

coupling means for connecting with a signal source which supplies a stop voltage-setting signal; and control means for establishing stop voltages according to output signals from said coupling means, said control means acting to compare said stop voltages with voltages corresponding to voltages developed across terminals of said capacitor cells and to control said charging current bypass means according to results of the comparisons, wherein said control means comprises a means for converting a voltage developed across terminals of said capacitor cell into a digital value and a comparator means for comparing the voltage-setting signal in the form of a digital signal supplied from said signal source via said coupling means with said digital value.

4. An electric power storage unit comprising:

a plurality of capacitor cells connected in series and charged with a charging current;

charging current bypass means connected in parallel with each said capacitor cell, respectively, and acting to bypass said charging current;

coupling means for connection with a signal source; and control means for establishing reference voltages according to output signals from said coupling means, comparing terminal voltages of said capacitor voltages, and controlling said charging current bypass means according to results of the comparisons, wherein through said coupling means said signal source supplies to said control means a pulse signal as an AC signal with a duty cycle corresponding to a reference voltage value to be controlled.

5. A method of controlling charging of an electric power storage unit consisting of a plurality of capacitor cells connected in series, said capacitor cells being charged with a charging current under control of parallel charging control units;

said parallel charging control units having charging current bypass means connected in parallel with said capacitor cells, respectively, and acting to bypass said charging current, coupling means for connection with a signal source, and control means for establishing reference voltages according to output signals from said coupling means, comparing terminal voltages of said capacitor cells, and controlling said charging current bypass means according to results of the comparisons, said method comprising the steps of:

supplying a voltage-setting signal to said control means to control said reference voltages; and charging said capacitor cells with said charging current until a sum of voltages developed across said capacitor cells reaches a given value, wherein said voltage-setting signal is an AC signal with a duty cycle corresponding to said reference voltages to be controlled.

6. A method of controlling charging of an electric power storage unit consisting of a plurality of capacitor cells connected in series, said capacitor cells being charged with a charging current under control of parallel charging control units;

said parallel charging control units having charging current bypass means connected in parallel with said capacitor cells, respectively, and acting to bypass said charging current, coupling means for connection with a signal source, and control means for establishing reference voltages according to output signals from said coupling means, said method comprising the steps of:

supplying a voltage-setting signal to said control means to control said reference voltages;

converting a terminal voltage of at least one of said capacitor cells into a digital value;

comparing said voltage-setting signal in the form of a digital signal with said digital value;

controlling said charging current bypass means according to results of said comparison; and charging said capacitor cells with said charging current until a sum of voltages developed across said capacitor cells reaches a given value.

7. An electric power storage unit comprising:

a plurality of capacitor cells connected in series and charged with a charging current;

charging current bypass means connected in parallel with each said capacitor cell, respectively, and acting to bypass said charging current;

coupling means for connection with a signal source that supplies a voltage-setting signal;

control means for establishing reference voltages according to output signals from said coupling means, and comparing terminal voltages of said capacitor voltages, wherein:

a terminal voltage of at least one of said capacitor voltages is converted into a digital value;

the voltage-setting signal in the form of a digital signal is compared with said digital value; and the charging current bypass means is controlled according to results of the comparisons.

* * * * *

UNITED STATES PATENT AND TRADEMARK OFFICE
CERTIFICATE OF CORRECTION

PATENT NO. : 5,726,552
DATED : March 10, 1998
INVENTOR(S) : Michio Okamura

It is certified that error appears in the above-identified patent and that said Letters Patent is hereby corrected as shown below:

Title Page, [73] Assignee, "Jeol Ltd." should read --JEOL Ltd.--.

Signed and Sealed this

Thirtieth Day of June, 1998

Attest:

BRUCE LEHMAN

Attesting Officer

Commissioner of Patents and Trademarks